June 30, 1970 A. H. FREEMAN ET AL 3,517,465
METHOD AND MEANS FOR CONTINUOUS SURFACE TREATMENT
Filed May 19, 1966 13 Sheets-Sheet 11

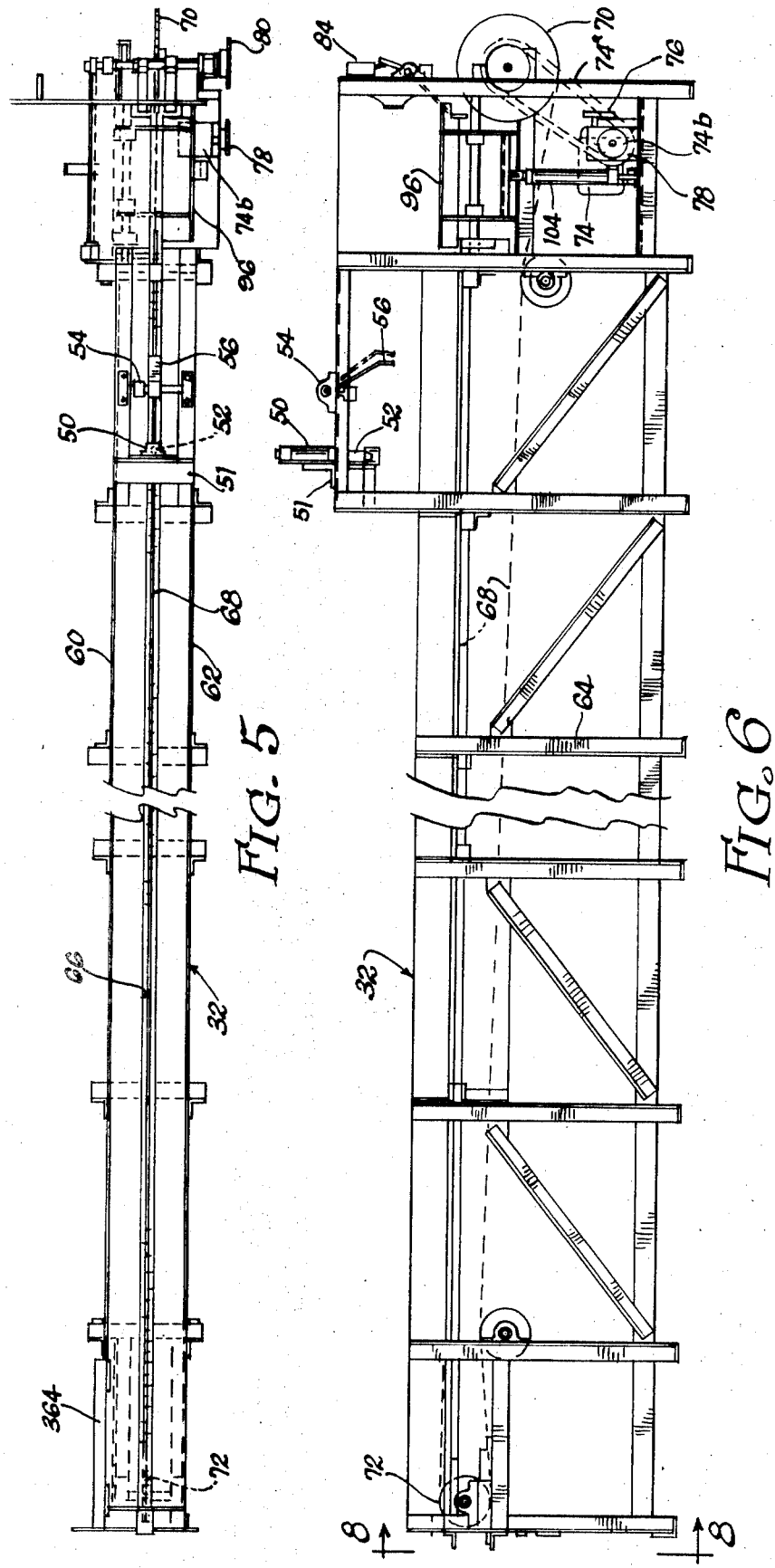

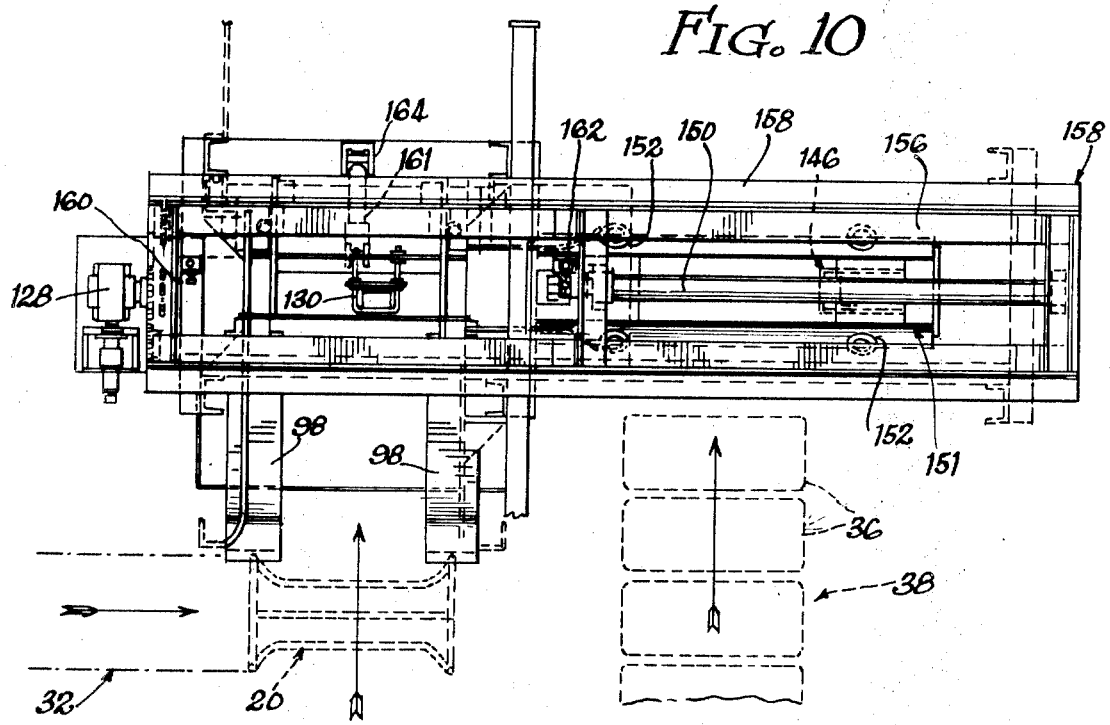
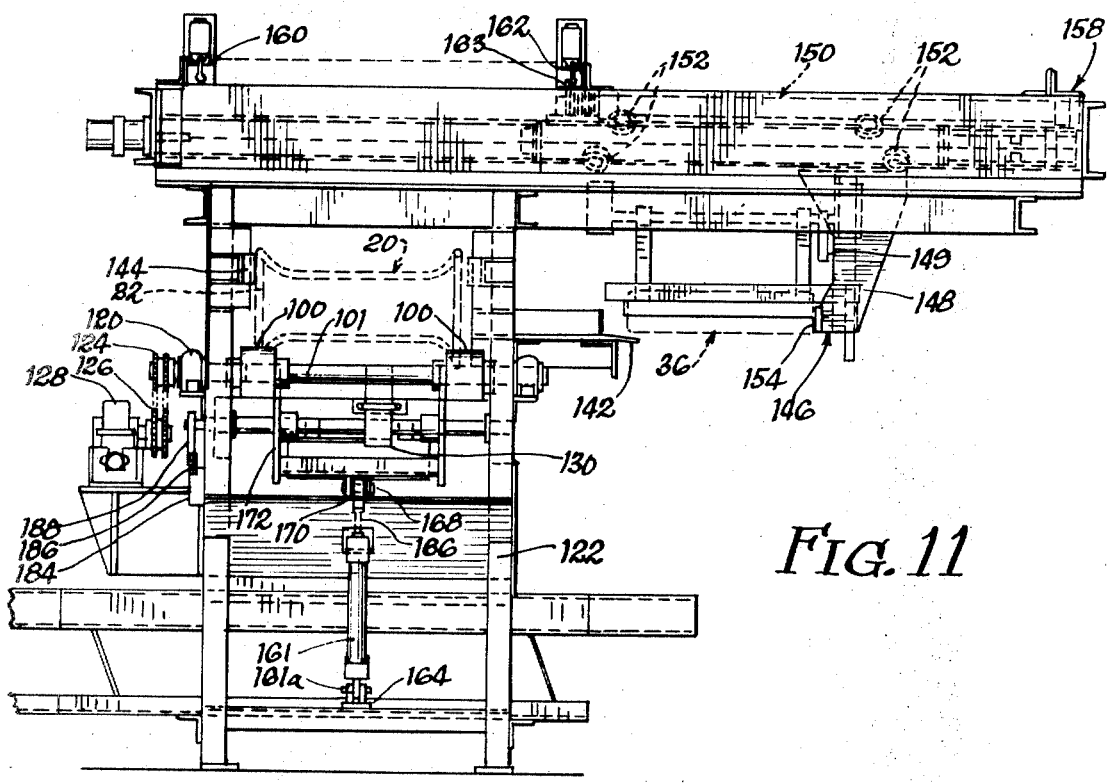

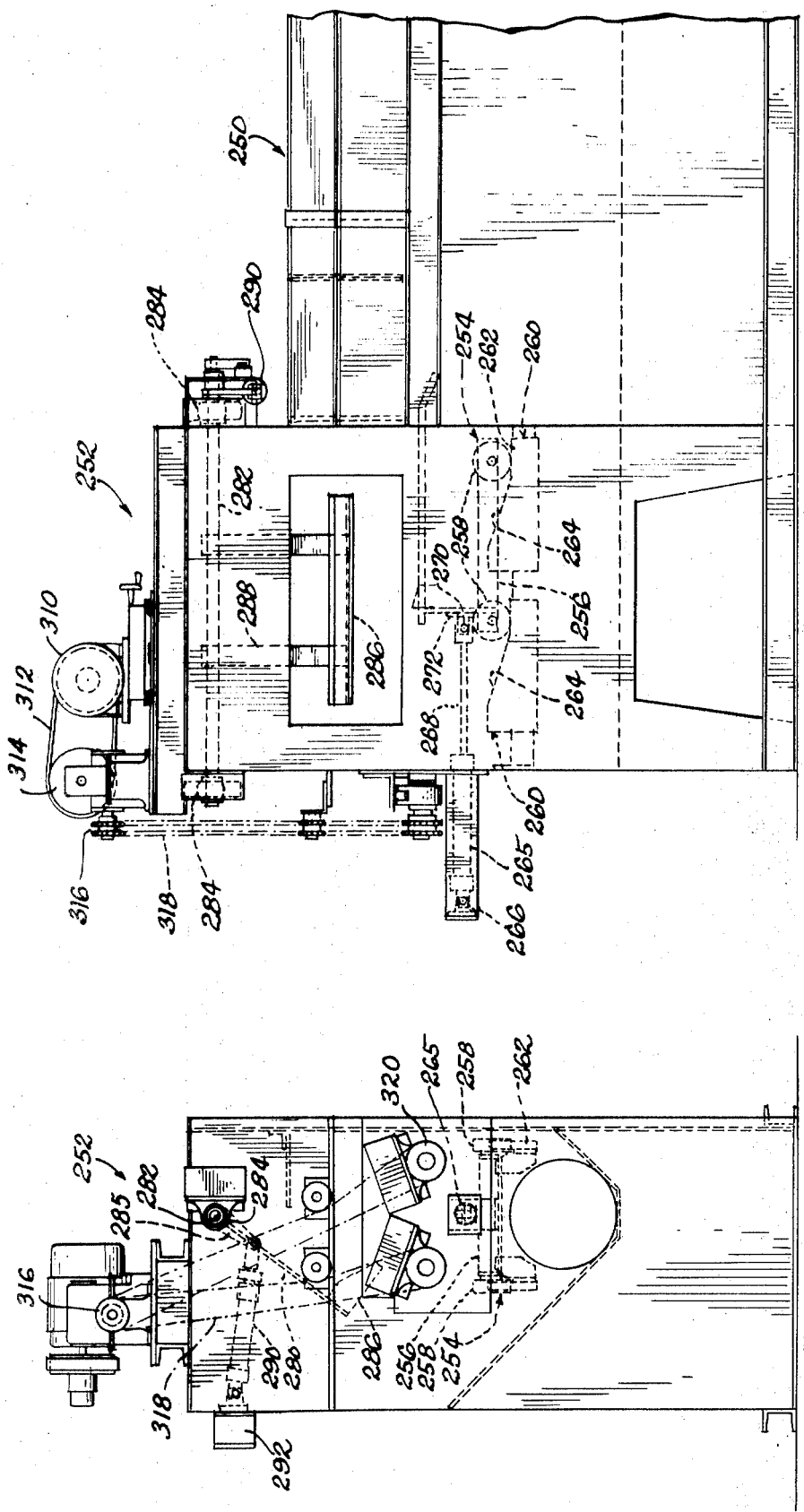

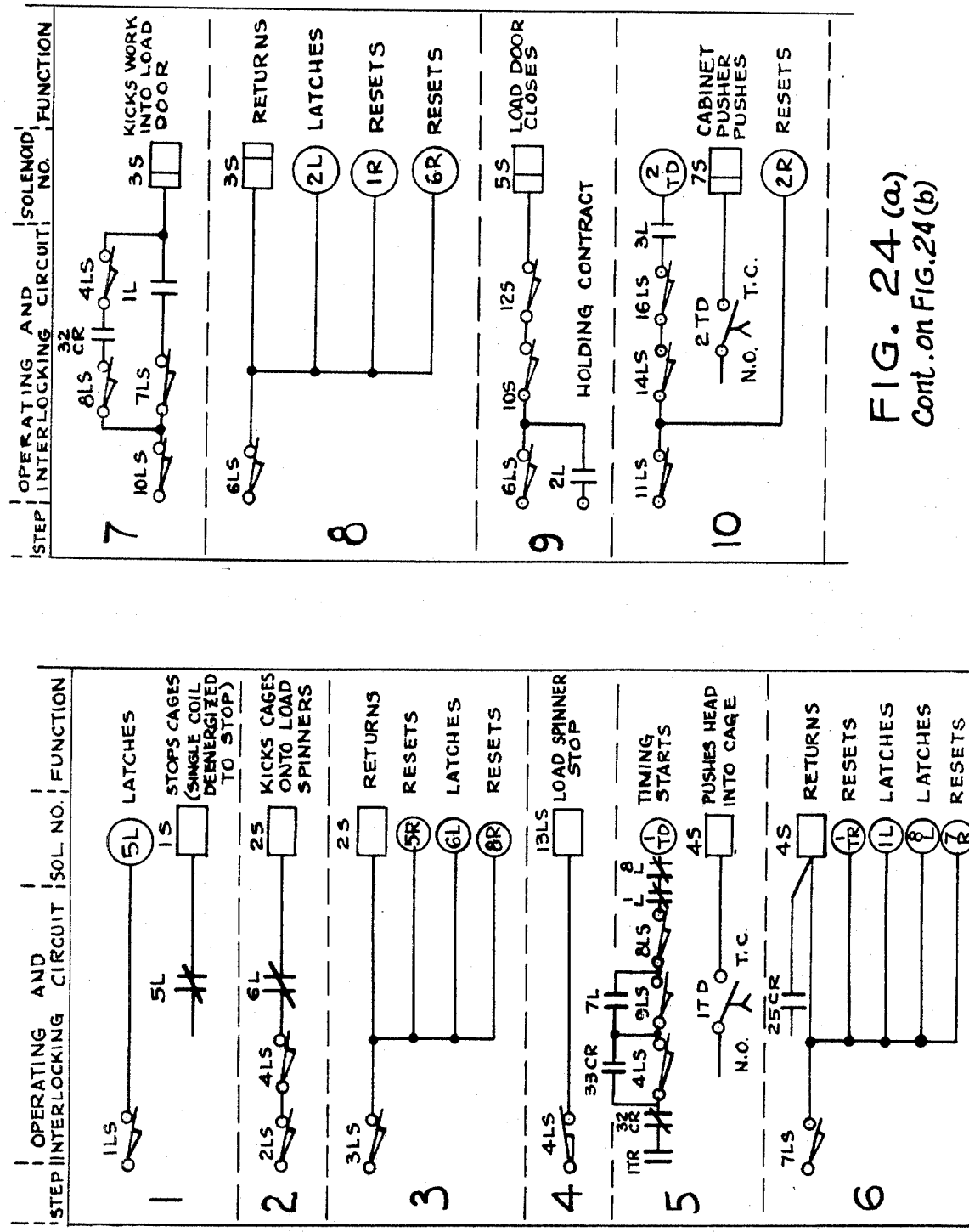
FIG. 24(a) Cont. on FIG.24(b)

United States Patent Office 3,517,465
Patented June 30, 1970

3,517,465
METHOD AND MEANS FOR CONTINUOUS SURFACE TREATMENT
Ardee H. Freeman, Granger, Harold F. Schulte, Mishawaka, and Hubert Davidson, South Bend, Ind., assignors to The Wheelabrator Corporation, Mishawaka, Ind., a corporation of Delaware
Filed May 19, 1966, Ser. No. 551,395
Int. Cl. B24c 1/00, 3/14
U.S. Cl. 51—319                                    10 Claims

ABSTRACT OF THE DISCLOSURE

A means and method for surface treatment of shaped articles of large dimension by throwing particulate material onto the surfaces of the articles, an open cage having circular rims into which the articles are inserted, means for loading the cage with article while the cage is in stationary position, means for transporting the loaded cage onto an elongate roller conveyor, means for endwise displacement of the loaded cages along the conveyor during turning movement of the conveyor to effect rotational movement of the loaded cage, means for throwing particulate material onto the loaded cage during rotational movement on the conveyor, means for unloading the article from the cage, and means for returning the empty cage to the loading position.

---

This invention relates to the surface treatment of heavy metal objects and it relates more particularly to an assembly capable of automatic operation for the continuous movement of heavy metal parts from a source of supply to a delivery station with an intermediate exposure of the surfaces of the metal parts to blast media for the treatment of the surfaces thereof.

To the present, such heavy metal parts, such as automotive engine cylinder heads, have been exposed for surface treatment to remove foundry sand, dirt, scale, or otherwise clean or treat the surfaces of the cast metal cylinder heads by mounting the same for suspension on an arm to enable turning movement of the part during exposure to the blast media for treatment of the exposed surfaces. Such treatment involves the use of a considerable amount of labor and equipment. Of even more importance is the greater amount of time required for carrying out the various operations of loading and unloading and projection of the blast media onto the surfaces of the parts whereby the rate of production is slow, thereby materially to increase the cost of operation. Further, the relatively static position assumed by the parts militates against full exposure of the surfaces to the blast media whereby adequate cleaning is difficult to achieve. Similarly, pockets are provided in which blast media can accumulate thereby to require additional processing for removal of the blast media and for treatment of the unexposed surfaces of the parts.

It is an object of this invention to produce a method for use in the surface treatment of heavy metal parts in which the surfaces of the metal parts are more fully exposed to the blast media for surface treatment whereby more adequate coverage is secured; in which the blast media is substantially completely dumped from the metal parts during treatment to enable substantially complete recovery of the blast media for re-use and whereby additional steps for removal of blast media from the treated metal parts becomes unnecessary; in which the loading and unloading of the metal parts for passage into and out of the blast section and the transportation thereof from the loading to the unloading station and through the blast section is minimized to reduce the amount of manual labor and permit continuous operation thereby materially to increase the rate of output of the machine; in which the machine is simplified in construction and easy and efficient in operation to provide a more effective surface treatment at less cost and with higher output; in which the machine is sturdy in construction to minimize down time for more continuous operation; and in which the amount of labor and material required per unit output of the machine is greatly reduced thereby to reduce the cost per unit of operation.

These and other objects and advantages of this invention will hereinafter appear and for purposes of illustration, but not of limitation, an embodiment of the invention is shown in the accompanying drawings, in which—

FIG. 5 is a top plan view of the empty cage conveyor;

FIG. 6 is a side elevational view of the empty cage conveyor shown in FIG. 5;

FIG. 10 is a top plan view of the elements in the loading station as shown in FIG. 9;

FIG. 11 is a side elevational view of the elements in the loading station shown in FIGS. 9 and 10;

FIG. 19 is a rear elevational view of the elements showing the portion of the machine in the delivery end of the conveyor roller;

FIG. 20 is a side elevational view of the portion of the machine shown in FIG. 19;

FIGS. 24a and 24b are diagrammatic views of the electrical controls and elements operated therewith arranged in the sequence of operations of the machine.

The invention will be described with reference to the surface treatment of cylinder heads cast of metal by the blasting of the surfaces of the cylinder heads with abrasive, steel shot, steel grit, or the like particulate material to effect cleaning or treatment of the surfaces. It will be apparent that the equipment described will have application also to the cleaning of other large or heavy metal objects or for the surface treatment of such large or heavy metal objects such as in the hardening of the surfaces by blasting with steel shot or grit, as is now well known in the trade.

The concepts of this invention reside in the construction and arrangement of equipment for mechanically handling the metal parts throughout the operation and which is automated for substantially continuous operation to provide for a high speed process which makes use of a minimum amount of manual labor and materials thereby materially to reduce the cost of processing per unit output of the machine.

Figure 12:
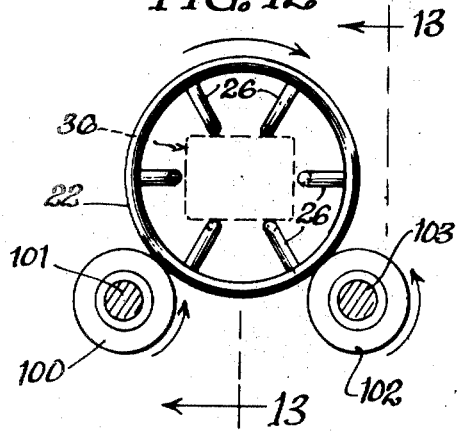
FIG. 12 is a schematic sectional elevational view showing the loaded cage on the spinner rolls in the loading section.
Figure 13:
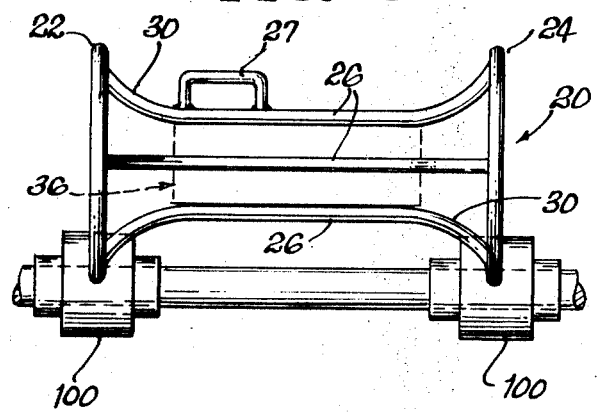
FIG. 13 is a side elevational view of the elements shown in FIG. 12.

In the practice of this invention, use is made of a plurality of open cages 20 which are adapted to be transported for recycling through the machine with the cast metal block supported therein during travel of the cages from the loading section to the unloading section and through a blast section in between. As illustrated in greater detail in FIGS. 12 and 13, each cage comprises a unitary assembly having a pair of longitudinally spaced apart ring members 22 and 24 interconnected one to the other lengthwise by a number of circumferentially spaced apart bars 26 which slope inwardly from the opposite ring members to a longitudinal central body portion in between and spaced one from the other to define an open basket dimensioned to correspond with the cross-sectional dimension of the casting 36 to enable said casting to be inserted through the ring member at one end for guidance by the tapered entrance portion 30 of the bars into the central basket for support between the central body portions of the crosswise extending bars. Thus the space about the supported casting is open except for the small portions engaged by the bars thereby to expose the entire outer surface of the casting as the cages are rotated with the casting supported therein.

For maximizing the exposure of the surface to the particulate blast media thrown onto the surfaces, it is preferred to form the cage bars 26 of bar stock of tubular or rectangular shape for minimum contact with the supporting casting and it is also preferred to space the bars for loosely receiving the casting therebetween so that during portions of the rotational movement, the bars will become spaced from the casting by an amount sufficient to enable the particulate blast media to gain entrance therebetween for surface engagement. Use can be made of a variable number of supporting bars 26 depending somewhat upon the construction and shape of the castings but it is undesirable to make use of less than three for three-point support of the casting and it is undesirable also to make use of so many bars as will excessively block recess to the surfaces of the casting. For best practice, it is desirable to make use of from three to six cross connecting bars 26. One of the cross connecting bars 26 is provided with an abutment 27 extending outwardly therefrom for a distance less than the periphery of the supporting ring members 22 and 24 for use in engagement with stops in positioning the cage member on supporting rollers, as will hereinafter be described Since the cage members will be exposed to the blast of the particulate media with which the surfaces of the castings are to be treated, such cage members should be fabricated of metal characterized by high abrasion resistance.

Figure 1:
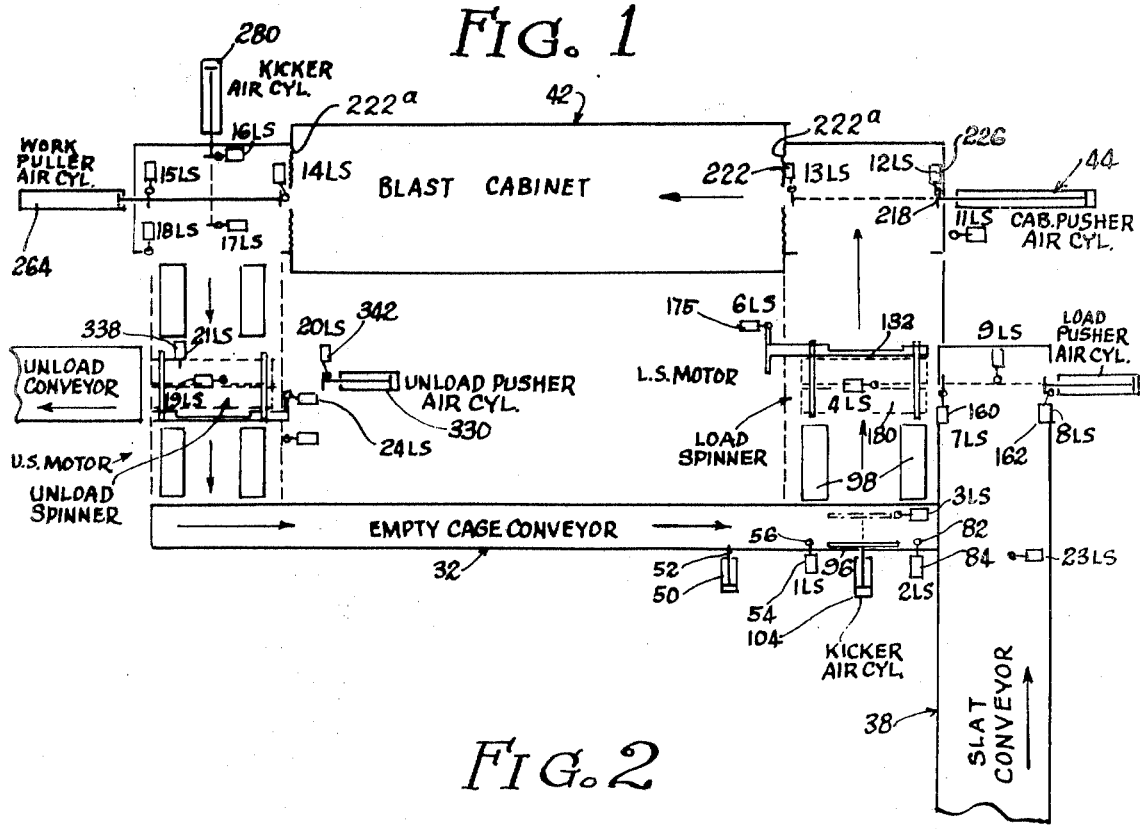
FIG. 1 is a schematic diagram of the cycle of the machine showing the various switch and operating members by which the sequence of operations are carried out automatically.
Figure 2:
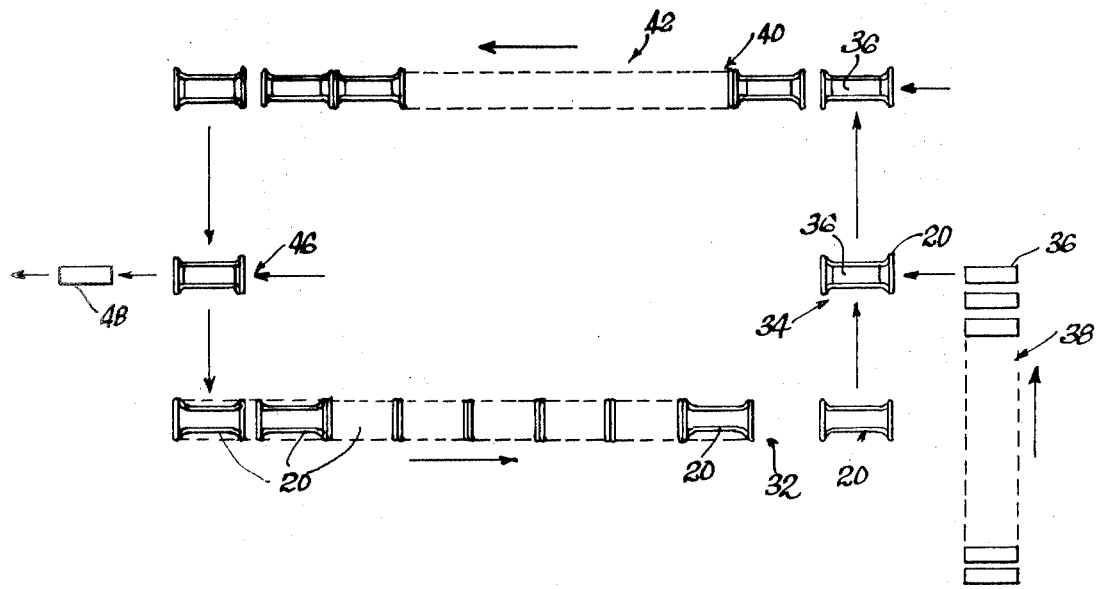
FIG. 2 is a schematic diagram which shows the stations through which the cage members are operated in accordance with the practice of this invention.
Figure 3:
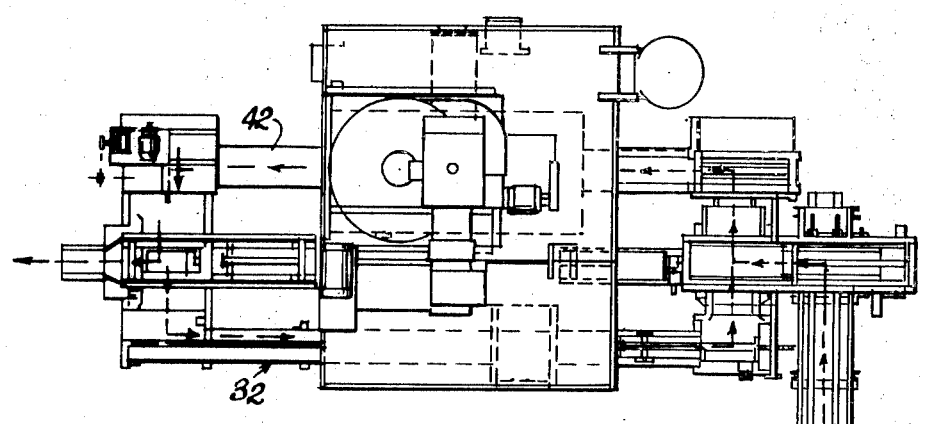
FIG. 3 is a schematic diagram showing the operational features of the machine.
Figure 4:
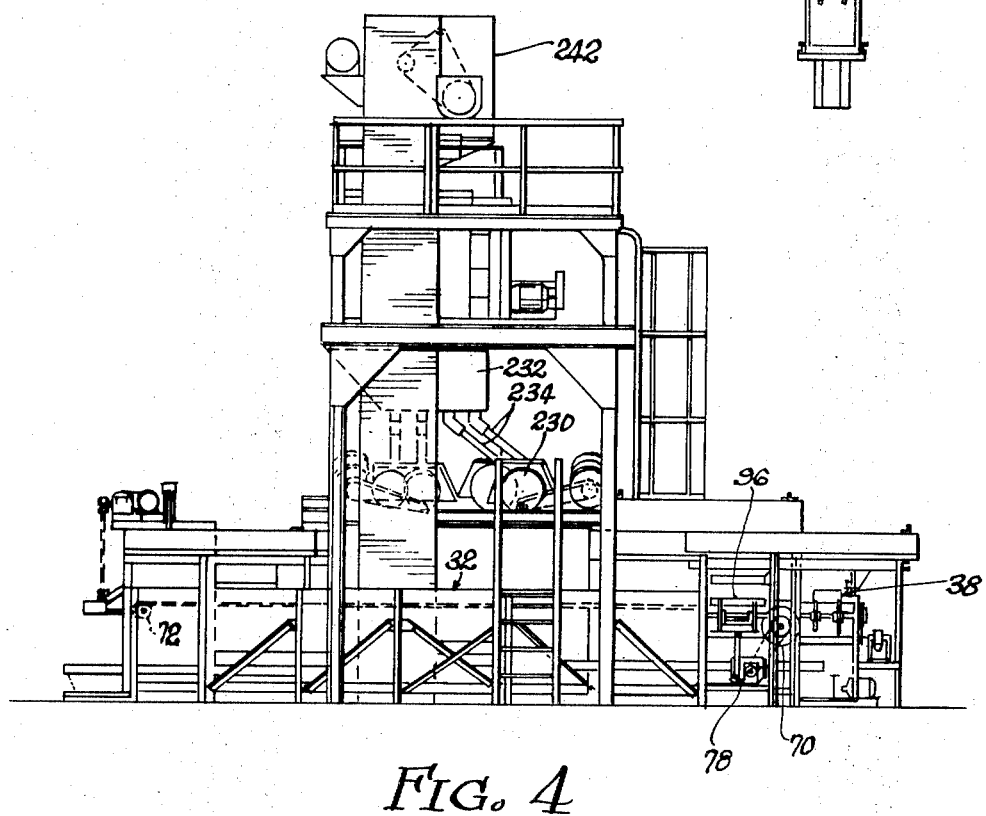
FIG. 4 is an elevational view of the blast section of the machine.
Figure 7:
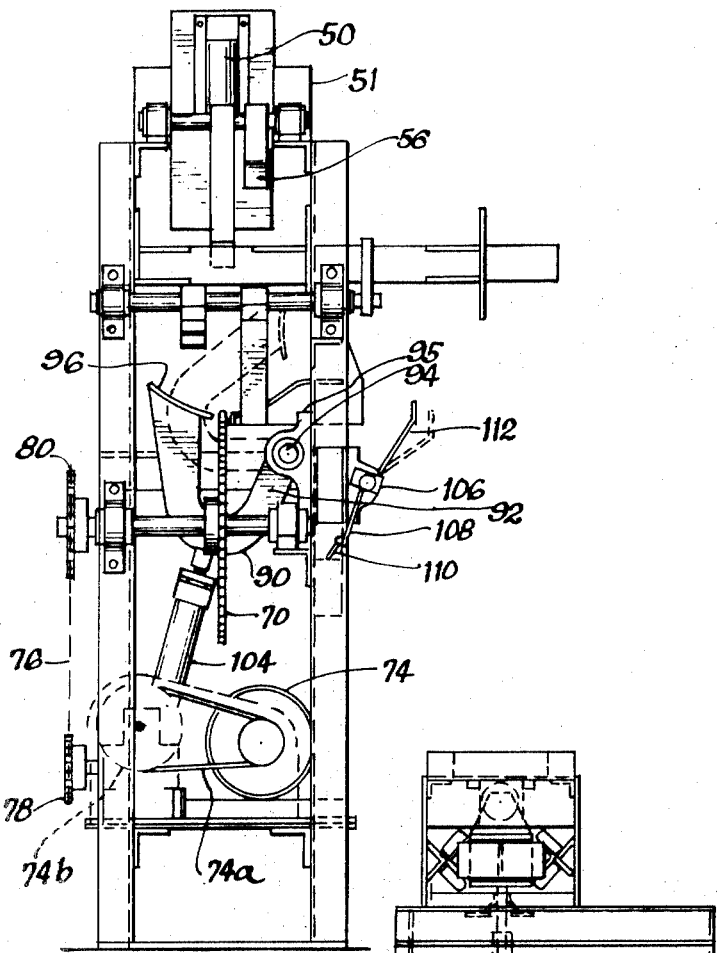
FIG. 7 is an elevational view of the cage conveyor from the front end.
Figure 8:
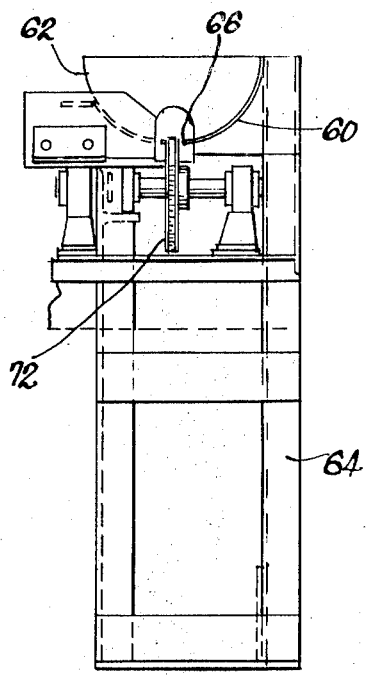
FIG. 8 is an elevational view of the conveyor shown in FIGS. 5 and 6.
Figure 18:
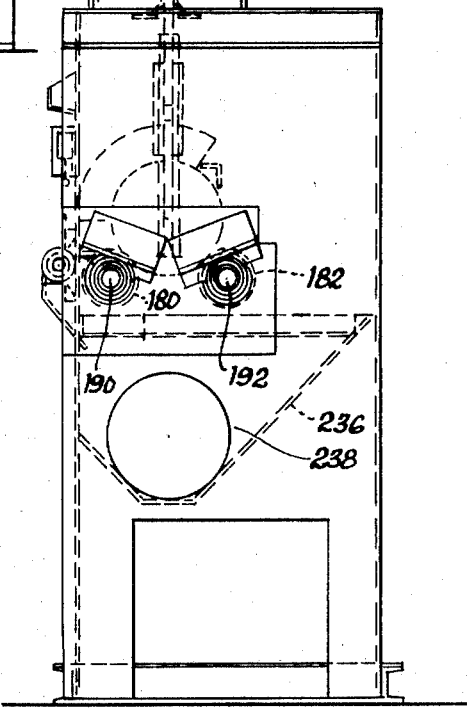
FIG. 18 is a front elevational view of the elements shown in FIGS. 16 and 17.
Figure 9:
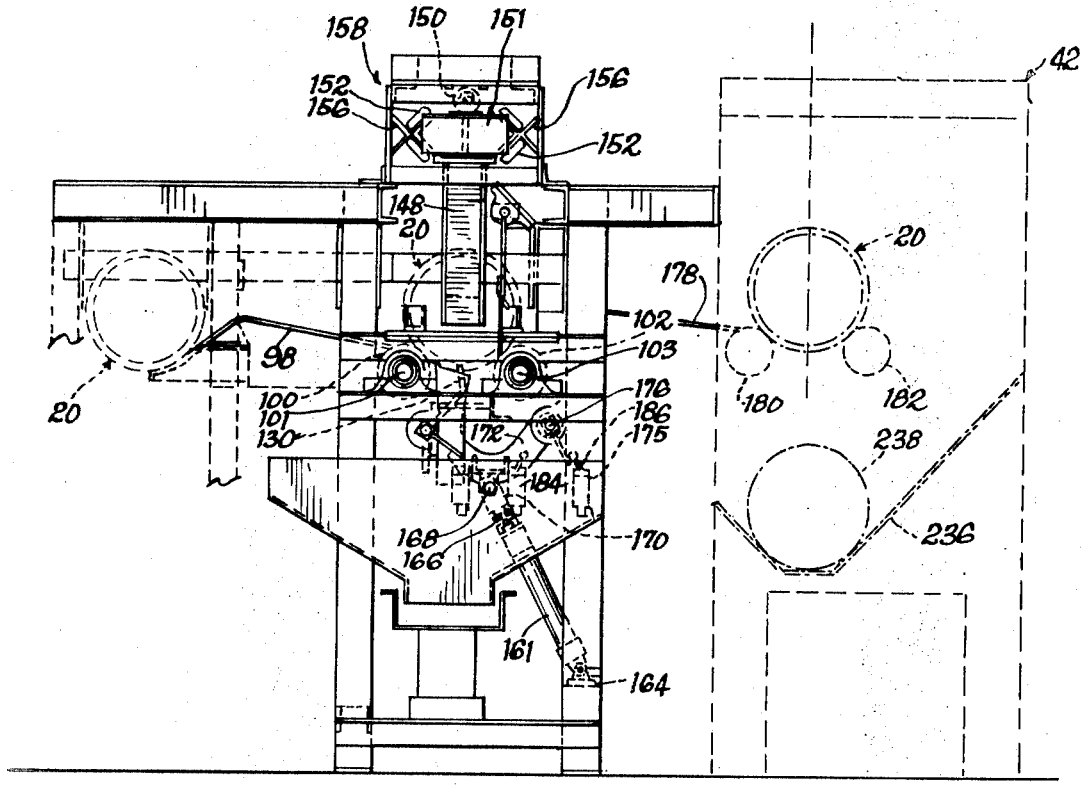
FIG. 9 is a front elevational view of the arrangement of elements in the loading station.

Referring now to FIGS. 1 and 2 of the drawings for a general description of the cycle of operation through which the cage members are processed, an empty cage 20 positioned at the end of the cage conveyor 32 is adapted to be displaced laterally to a loading station 34 where it hesitates while a casting 36, in endwise alignment with an open end of the cage, is displaced endwise by a pusher member from the casting conveyor 38 for insertion into the cage 20. When loaded, the cage is displaced laterally from the loading station 34 onto an elongate conveyor 40 which extends lengthwise through the blast cabinet 42 in which a number of rotating wheels are mounted for throwing particulate blast media onto the surfaces of the castings as they are advanced through the blast housing. The conveyor 40 on which the loaded cages are supported during passage through the blast housing comprises a pair of rotating cylindrical sections for continuous rotation of the cages while supported on the peripheral surfaces thereof whereby the castings are rotated with the cages during passage through the blast housing for maximum and uniform exposure of all surfaces to the blast media. The loaded cages are displaced stepwise along the conveyor 40 by a pusher mechanism 44 which engages the loaded cage at the entrance end of the conveyor to effect stepwise displacement by an amount corresponding to the length of the cage during each stroke. Thus the cages are aligned in end to end relation on the conveyor 40 for stepwise displacement lengthwise over the rollers during each stroke of the pusher mechanism.

When a loaded cage reaches the end of the roller conveyor 40 after passage through the blast housing 42, the loaded cage is displaced laterally from the rollers to an unloading station 46 where the cage is held stationary momentarily while a pusher is actuated through the cage to effect endwise displacement of the processed casting 48 from the cage to a delivery chute. The empty cage is then displaced further laterally from the unloading station 46 to the cage conveyor 32 whereby it is returned towards the starting position for another cycle of operation.

Having generally described the cycle of operation of the machine, more detailed description will now be given of the construction and operation of the various components thereof.

The conveyor 32 over which the empty cages are carried from the unloading end to the loading end comprises an elongate trough formed of a pair of downwardly inclined side walls 60 and 62, preferably of curvilinear shape, supported on a framework 64 with the bottom edges of the side walls being spaced a short distance one from the other to provide an elongate slot 66 therebetween through which an endless chain 68 operates to define the bottom wall on which the ring members 22 and 24 of the empty cages 20 rest to effect endwise displacement of the cages through the trough. The conveyor chain 68 operates about sprockets 70 and 72 rotatably mounted on opposite ends of the frame with the sprocket 70 being a driven sprocket operatively connected to a driving motor 74 by a belt 74$^a$ connecting the driving motor with a reducing gear 74$^b$. The reducing gear 74$^b$ is in turn operatively connected to the sprocket 70 by a belt or chain interconnecting roller 78 on the shaft of the reducing gear and roller 80 on the shaft of the sprocket 70. The chain 68 is operated about the sprockets 70 and 72 to displace the top flight of the chain in the direction towards the head end of the machine.

In order to free the empty cage 20 from interference with other cages on the conveyor for displacement of the empty cage from the head end of the machine to the loading station 34, it is desirable to effect separation between the leading cage on the conveyor and the remainder. For this purpose, the empty cage conveyor 32 is provided with means for engagement with the second of the aligned empty cages as the first is displaced to the head end of the conveyor. In the modification illustrated in FIGS. 5 and 6, there is provided a bracket 51 supporting a solenoid 50 having a cage stop pin mounted therein for reciprocal movement vertically into and out of the path of the cage ring members 22 and 24. Located forward of the stop pin by an amount less than the length of a cage 20 is a switch member 54 having a switch arm 56 mounted for rocking movement between switch making and unmaking position and which extends downwardly into the path of the ring members 22 and 24 so as to be engaged by a ring member as the leading cage is advanced forwardly along the conveyor.

In operation, as the ring member at the end of the cage comes into engagement with the switch arm 56, the switch 54 is made for actuation of the solenoid whereby the stop pin 52 is extended into the path of the ring member of the oncoming cage to stop the cage short of the one in loading position. Instead of a solenoid 50, us can be made of an air or fluid cylinder for actuation of the stop pin as a piston rod between extended and retracted positions. As the leading cage is displaced laterally from the conveyor 32 to the loading position 34, a switch arm 108 is engaged to make switch 106 to operate the solenoid or air cylinder 50 to effect return of the stop pin 52 to retracted position thereby to free the next cage for continuing its displacement to the head end of the conveyor. Since frictional engagement is relied upon between the chain and the cages to effect displacement of the latter, it will be obvious that the chain can slip relative to the cages when the latter are stopped and will effect continuing displacement thereof when freed by the stop pin 52.

Transfer of the empty cage from the head end of the conveyor 32 to the loadng station 34 is effected by a substantially U-shaped rocker arm 90 pivoted at one end 92 on a pin 94 fixed by a bracket 95 to the stationary frame member. The rocker arm 90 is povided on its other end with a plate 96 of curvilinear shape which is positioned in lengthwise alignment with the conveyor slat 66 to form an extension thereof and it is dimensioned to have a length greater than the length of the cage so that the cage at the head of the machine will be engaged by the plate. Means are provided for effecting rocking movement of the arm 90 about its pivot from normal position to raised position whereby the plate 96 operates to lift the empty cage from the conveyor for lateral displacement onto a rail or platform 98 which is downwardly inclined and extends to the loading station 34 to enable the empty cage which is displaced by the rocker arm 90 to roll down the platform onto the spaced rollers 100 and 102 at the loading station. Rocking movement of the arm 90 between raised and lowered positions is controlled by an air cylinder 104 in which the outer end of the cylinder is pivotally secured to the frame while the outer end of the piston rod is pivotally secured to an intermediate portion of the rocker arm.

Return of the rocker arm 90 to normal position is signalled to the solenoid or air cylinder 50 for withdrawal of the stop pin 52 by the switch 105 having a switch arm 108 engaged by the switch pin 110 in response to return of the rocker arm 90. Displacement of the empty cage 20 from the conveyor section by the plate 96 is signalled by the switch arm 112 which is displaced to the broken line position by the passage of the empty cage during movement from the empty cage conveyor 32 to the loading station 34.

Means are provided at the loading station to support the empty cage 20 in position to have the casting 36 inserted therein including means for rotationally positioning the cage for proper alignment of the supporting cage arms 26 to receive the casting and means for bracing the cage against lengthwise displacement while the casting is being inserted therein.

For support of the cage and for rotational adjustment of the cage there is provided a pair of laterally spaced apart spinner rollers 100 and 102. The rollers are longitudinally spaced apart on shaft 101 and 103 by an amount corresponding to the spaced relationship between the ring members 22 and 24 of the cages and the ends of the shafts 101 and 103 are rotatably supported in bearings 120 fixed to a structurally strong and rigid frame section 122. The shafts are provided at their ends with gear members 124 operative interconnected to gears 126 on the shaft of a driving motor 128 to effect rotational movement of the spinner rollers in the direction indicated by the arrows in FIG. 12.

Thus the cage 20 at rest on the spinner rollers 100 and 102 will be rotated by the rollers until stopped in proper orientation for receiving the casting. A cage stop and limit switch trip 130 extends into the path of the stop 27 on the cage rod 26 to stop rotational movement of the cage when in proper alignment for receiving the casting.

Conveyor means 38 are provided alongside the cage transport for prepositioning a casting 36 in endwise alignment with the empty roller supported cage in preparation for insertion of the casting therein. Any number of conventional conveyor systems can be employed such that detailed description of the conveyor need not be given. Suffice it to say that the conveyor 38, which may be a slat conveyor, has its upper run at a level corresponding to the slat supported cage so that the casting 36, which is supported on the upper run of the conveyor and carried to the forward end portion of the conveyor, will be in endwise alignment with the roller supported empty cage 20.

Means are provided at the loading station for pushing the casting to effect endwise displacement of the casting rearwardly over the surface of the conveyor and onto a shelf 142 rigid with the frame 122 and into the empty basket of the aligned roller supported cage 20. The roller supported cage is backed up to prevent displacement responsive to the forces thrusting the casting into the cage by means of one or more guide bars 144 rigid with the frame and in position to be engaged by the ring member 22 at the rearward end of the cage.

The pusher means comprises a ram 146 suspended by a frame 148 from the underside of a carriage 151 supported on rollers 152 for endwise displacement between rearward and forward positions of adjustment with the piston of an air cylinder 150 which are interconnected. The frame 148 supports the ram 146 at its forward end portion to provide a section 154 in endwise alignment with about the center of the cage and at a level slightly above the top run of the conveyor and spaced a short distance rearwardly therefrom, when in forward position. The rollers 152 for supporting the carriage during reciprocal movement are arranged in longitudinally spaced apart relation about the periphery of the carriage and the rollers operate in tracks 156 rigid with the frame 158 which is in fixed position at the loading station. Limit switches are provided including a switch 160 at the forward end for engagement by a trip 163 on the carriage to signal the displacement of the carriage to its operated position of adjustment and another switch 162 is spaced rearwardly of the first switch 160 by an amount corresponding to the stroke of the cylinder to signal return of the carriage to its retracted forward position. The stroke is dimensioned to have a length calculated to effect displacement of the ram 146 by an amount corresponding to the distance between the end portion 154 of the ram and the cage whereby a casting on the conveyor in endwise alignment with the cage and in the path of the ram will be displaced by the ram forwardly into the cage in response to movement of the air cylinder 150 from retracted to operated position.

It is preferred to provide for a stroke which will be slightly greater than the distance between the cage and the ram, when the latter is in retracted position, so that the casting will be introduced into the cage beyond the ring member 24 by an amount to balance the casting by centering the casting within the cage substantially equidistantly between the ring members. It will be understood that other reciprocable means for linear displacement of the ram can be employed instead of the air cylinder, such as a fluid cylinder, screw actuator and the like.

The loading station 34 also includes means for displacement of the loaded cage from the spinners 100 and 102 to the adjacent section provided with feed rollers over which the loaded cages are advanced from the loading end, at the rear of the machine, to the unloading end with passage of the loaded cages through the blast cabinet in between wherein the surfaces of the casting are subjected to the described surface treatment.

The displacement means, at the loading station, comprises an air cylinder 161 fixed at one end on a pivot pin 161ᵃ fixed to a bracket 164 on the frame 122 while the end of the piston rod 166 is fixed at its outer end onto a pivot pin 168 mounted on a bracket 170 on the underside of a cage pusher arm 172. The free end of the arm 172 underlies the cage on the side towards the conveyor while the other end of the arm is pivoted on a pin 176 underlying the cage on the opposite side whereby the arm is capable of rocking movement about its pivot between raised and lowered positions responsive to actuation by the air cylinders 161.

Responsive to rocking movement of the arm to raised position, the cage pusher arm comes into engagement with the underside of the loaded cage to lift it off of the spinner rolls for displacement laterally onto a ramp 178 over which the loaded cage rolls onto the laterally spaced apart conveyor rollers 180 and 182 for passage through the blast cabinet. Switch means including switch boxes 175 and 184 having a switch arm 186 are positioned for actuation by the trip 188 to signal movement of the kicker at raised and lowered positions.

Figure 14:
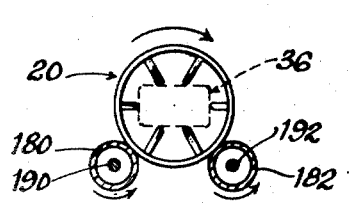
FIG. 14 is a schematic sectional elevational view showing the loaded cage on the conveyor rolls.
Figure 15:
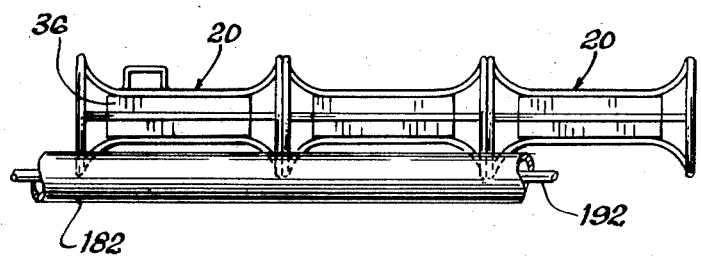
FIG. 15 is a side elevational view of elements shown in FIG. 14.

In the conveyor section, the loaded cage is cradled between elongate rollers 180 and 182 mounted on shafts 190 and 192 supported at their ends in suitable bearings and rotated by means of a driving motor for turning movement together, in the same direction, as illustrated in FIG. 14. The loaded cages are adapted to be displayed forwardly on the supporting conveyor rollers while the latter are being rotated to impart rotational movement to the loaded cages as they are advanced along the rollers through the blast cabinet. Displacement of the cages lengthwise along the rollers is effected stepwise in response to the forward displacement of the rearward cage last to be deposited on the rollers. The portion of the roller conveyor on which the loaded cages are deposited is enclosed within a vestibule and a portion of the roller conveyor between this entrance vestibule 199 and the blast cabinet is also enclosed within a tunnel 201. The portion of the conveyor between the blast cabinet and the exit vestibule is also enclosed within a tunnel to prevent particulate material from being thrown into the atmosphere.

Figure 16:
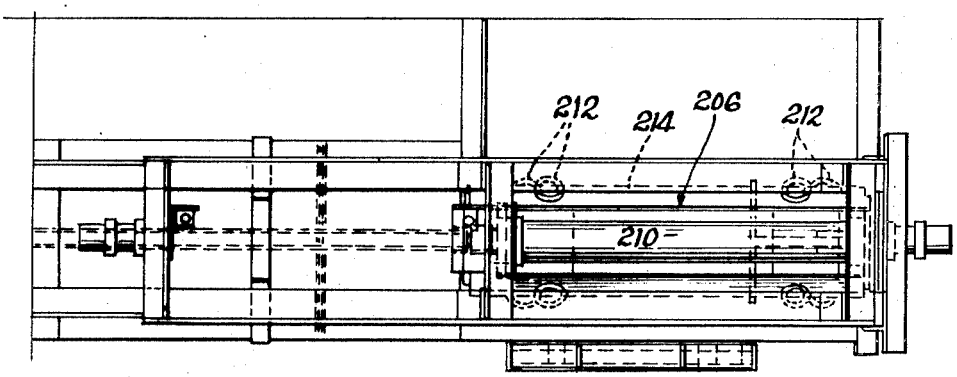
FIG. 16 is a top plan view of the front end portion of the conveyor roll section.
Figure 17:
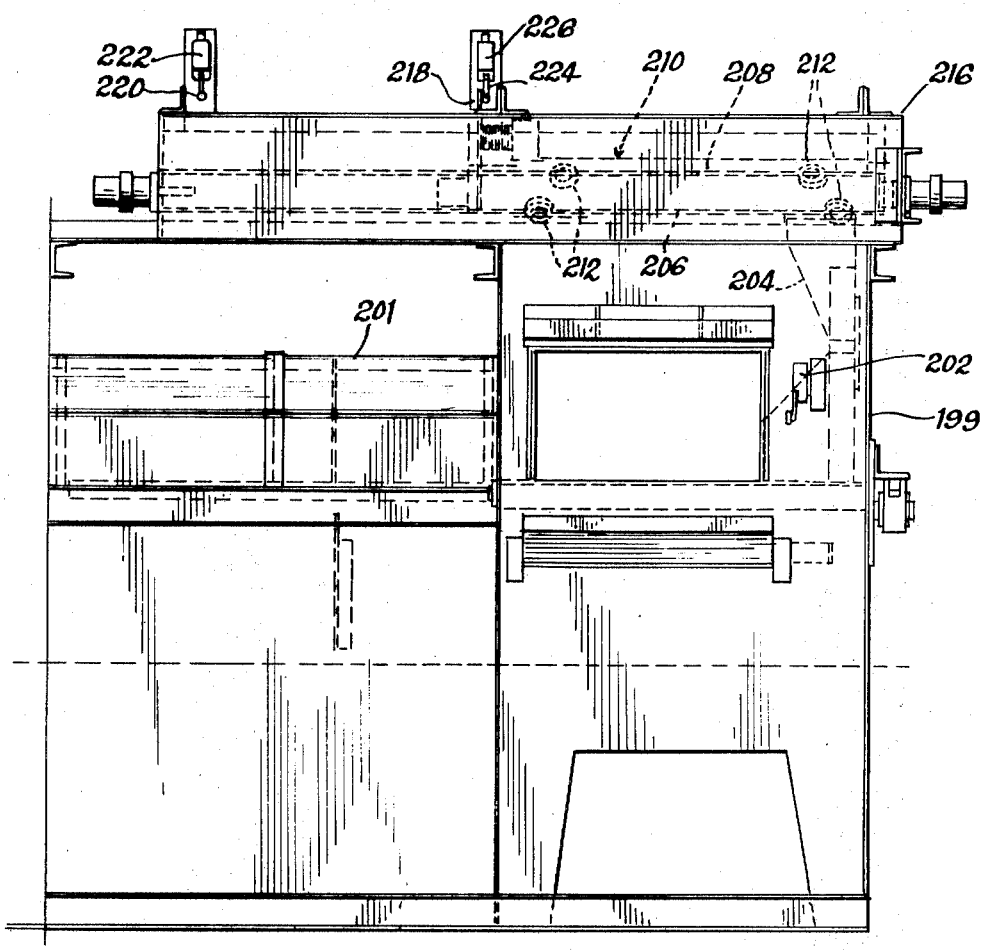
FIG. 17 is a side elevational view of the elements shown in FIG. 16.
Figure 21:
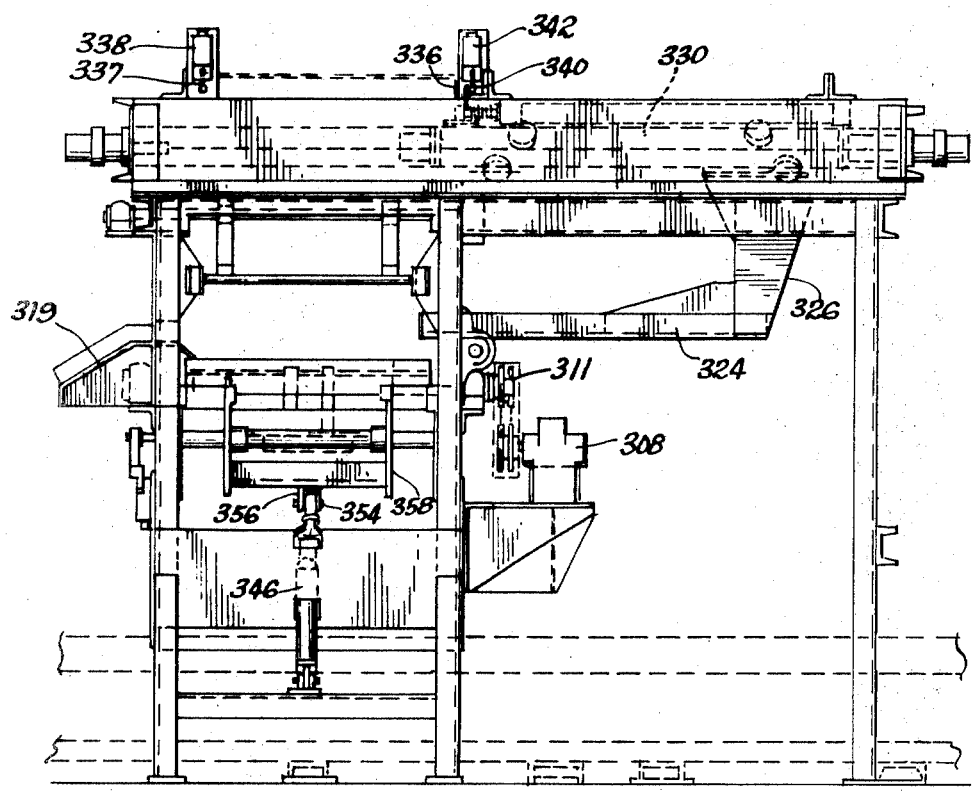
FIG. 21 is a side elevational view of the portion of the machine in the unloading section.
Figure 22:
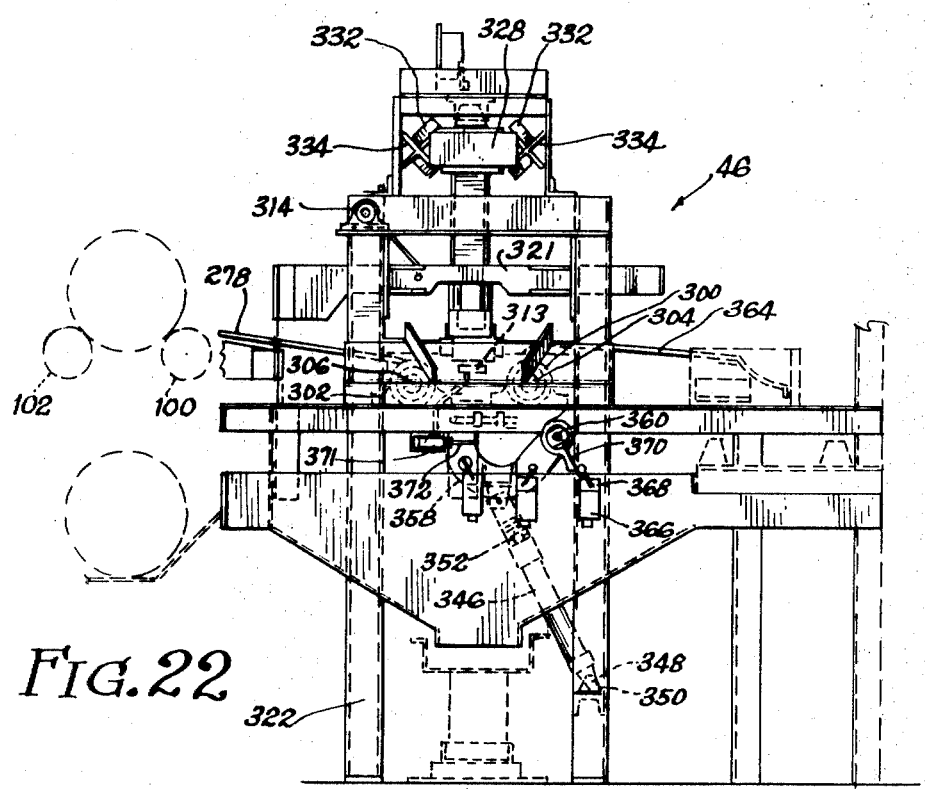
FIG. 22 is a rear elevational view of the portion of the machine shown in FIG. 21.

As illustrated in FIGS. 16 and 17, the cage ram 202 is suspended from a bracket 204 depending from a ram carriage 206 fixed to the head 208 of an air cylinder 210. The carriage is guided for reciprocal movement by rollers 212 riding on tracks 214 of a cylinder supporting frame 216. Thus the ram is supported during movement of the cylinder between forward and retracted positions of adjustment. A limit switch trip bar 218 is fixed to the cylinder in position to engage a switch arm 220 of a limit switch 222 when in its forward position of adjustment and to engage the switch arm 224 of another limit switch 226 when the cylinder returns to its retracted position of adjustment.

In its normal retracted position, illustrated in FIGS. 16 and 17 of the drawings, the end portion of the roller conveyor crosswise of the loading section is free from obstructions to receive the loaded cage upon lateral displacement from the loading station 34. The ram 202 is positioned immediately rearwardly of the deposited cage and in endwise alignment therewith and the stroke of the cylinder, and corresponding forward movement of the ram, is adapted to correspond to a distance slightly greater than the length of the cage so as to effect forward displacement of the loaded cage by an amount greater than the length thereof to again free the space for receipt of the next loaded cage.

As the cage is displaced forwardly along the spinning rollers 180 and 182, it comes into engagement with the cage immediately in advance thereof to effect incremental displacement of the other cages aligned in end to end relation on the spinning rollers. Thus the advancement of the rearmost cage by the ram operates to advance all of the cages a distance corresponding to one cage length along the roller conveyor.

An intermediate portion of the supporting spinner rollers 180 and 182 is enclosed by a blast cabinet dimensioned to have a length corresponding to a multiple of the cages, such as a length corresponding to five to six cages in the modification illustrated in the drawings. The cabinet, in the form of a sheet metal housing, is provided with entrance and exit openings in endwise alignment with the rollers for passage of the loaded cages into and out of the cabinet. Flexible flaps 222ᵃ are provided at the entrance and exit openings for purposes of sealing off the openings about the cages to minimize the passage of particulate material from within the blast cabinet in response to the ricochet of such particulate material thrown at high velocity onto the rotating cages in the blast cabinet.

Mounted at the top of the blast cabinet are a plurality of wheels 230 which are fed particulate treating material from a supply bin 232 through communicating tubes 234 to the inner portions of the wheels whereby the particulate material is thrown outwardly from the periphery of the wheels in a direction downwardly onto the loaded cages while being rotated on the spinning rollers. Centrifugal blasting wheels of the type described are of conventional construction, as represented by the products marketed by The Wheelabrator Corporation under the name "Wheelabrator," and more fully described in U.S. patents, such as No. 2,819,562.

By proper location of the wheels 230 within the blast cabinet and by proper angular arrangement of the wheels, substantially the entire length of the section of the rollers housed within the blast cabinet can be exposed to the blast of the particulate material for processing the surfaces of the casting exposed during rotational movement of their supporting cages. By reason of the ricochet of particulate material thrown at high velocity onto the surfaces of the castings, surfaces which might otherwise be concealed are exposed to the blast whereby substantially uniform coverage is secured for treatment of the surfaces of casting with particulate material.

The spent particulate material falls gravitationally into the trough 236 at the bottom for displacement along the bottom by a conventional screw conveyor 238 to a lateral screw whereby the particulate material is deposited in an elevator 240 and raised to a separator 242 where the dirt or other refuse is separated from the particulate material for return of the cleaned particulate material to the hopper 232 for feeding the wheels.

Thus the castings are exposed to the blast of particulate material for the period of time corresponding to the time that the cages are enclosed within the cabinet. Rotation of the castings with the cages operates not only to provide maximum exposure of the surfaces of the castings to the treating material but such rotational movement operates also to dump particulate material which might otherwise collect in the pockets of the castings thereby to deliver a casting which is clean and relatively free of particulate material and thereby also to reduce the amount of loss or waste of particulate material.

Since the spinning rollers 180 and 182 are exposed to the blast of the particulate material, it is preferred to fabricate the exposed portions of the rollers of a metal which is characterized by high erosion resistance. In a typical operation for cleaning cylinder heads, the blast cabinet is dimensioned to correspond to five lengths of the loaded cages and it is provided with four blasting wheels arranged lengthwise of the housing. The rollers are operated to rotate the cages at about 40 revolutions per minute and the cages are displaced along the rollers and through the blast area at a linear speed averaging about 900 cages per hour.

From the blast cabinet, the loaded cages are advanced over the spinning rollers through a covered section 250 to an unloading vestibule 252 located at the forward end of the roller conveyor and in lengthwise alignment therewith.

Located within the unloading vestibule is a carriage assembly 254 having a base 256 below the rollers 180 and 182. The cradle or shuttle car is mounted on wheels 258 which ride on laterally spaced apart tracks 260 having an entrant portion 262 which is level and an upwardly inclined portion 264 which serve to raise the cradle as the wheels ride up the incline 264.

Laterally spaced apart arms 266 extend upwardly from the opposite sides of the cradle with the end portions below the cage carried on the rollers 180 and 182, when the cradle is in its normal or lowered position on the track, but which engages the cage to lift the cage off of the rollers during movement of the cradle forwardly up the incline towards its raised position.

Means are provided to effect movement of the cradle from the retracted lowered position to the advanced raised position responsive to movement of the rearmost cage into the vestibule. Such means, illustrated in FIGS. 19 and 20, comprises an air cylinder 265 pivoted at one end onto a bracket 266 fixed to the vestibule frame while the end of the piston rod 268 engages a pin 270 extending rearwardly from a bracket 272 anchored onto an intermediate portion of the cradle. After the cage has been discharged from the cradle, air cylinder 264 returns the cradle to its rearward, lowered and retacted position.

Displacement of the cradle to raised position to lift the cage off of the rollers is signalled by a trip on the cradle in position to engage a switch arm of a switch 15LS in the path of the cradle when in raised position. Return of the cradle is signalled by the switch 14LS.

As the cage is lifted off of the rollers responsive to the displacement of the cradle up the track, the cage will be held by the cradle in a stationary position above the rollers. Other means are provided, responsive to movement of the cradle to raised position, for lateral displacement of the raised cage from the vestibule 250 and onto a ramp 278 for delivery to the unloading section 46.

For this purpose, there is provided a shaft 282 extending lengthwise of the vestibule above the rollers and which is supported at its ends in bearing members 284 which enables free rotational movement of the shaft. Fixed to longitudinally spaced apart portions of the shaft are levers 285 having arms 288 extending angularly downwardly to the outside of the cage with an end portion 286 turned inwardly to underlie longitudinally spaced apart portions of the raised cage but to clear the rollers when the cage is lifted by the cradle from the periphery of the rollers. The arm 288 is adapted to be rocked about its pivot to lift the cage from the cradle and to effect lateral displacement of the cage from the vestibule responsive to rocking movement of the arm in the counter-clockwise direction in FIG. 19 from normal retracted position to actuated position. Such rocking movement of the arm is effected by an air cylinder 290 pivoted at one end onto a bracket 292 fixed to the vestibule frame while the end of the piston rod 294 is pivoted onto an intermediate portion of the lever 285 outwardly of its pivot.

FIGS. 19 and 20 show the drive for the cage supporting rollers 180 and 182 including a motor 310 connected by a chain 312 to a reducer 314 having sprockets 316 connected by chains 318 to the sprockets 320 on the ends of the roller shafts.

The unloading station is somewhat similar in construction to the loading station previously described in that the loaded cage 20 comes down the inclined ramp 278 onto a pair of laterally spaced apart spinner rollers 300 and 302 having ring sections longitudinally spaced apart on shafts 304 and 306 by an amount corresponding to the length of the cage for support of the ring members thereon. The spinner rollers are turned by the driving means including the motor 308 and chain interconnected sprocket 311, in somewhat the same manner as in the loading section, to rotate the loaded cage until the cage stop and limit switch trip 313 is engaged by the stop 27 on the cage rod 26 to block further rotational movement of the cage from the proper oriented position for displacement of the casting therefrom.

Means are provided at the unloading section for forward displacement of the casting from within the cage and onto a ramp 319 for delivery. Again a backing plate 321 is provided to extend across the rear of the frame and which is fixed to the frame at a level above the rollers dimensioned to be less than the height of the cage thereby to be in a position to engage the ring member to prevent axial displacement from the rollers responsive to the thrust applied in ejecting the casting axially from the cage.

The ejection means comprises an elongate horizontally disposed ram 324 fixed at its forward end to a frame member 326 depending from a carriage 328 shiftable with the movable member of a horizontally disposed air cylinder 330. The carriage is provided with longitudinally spaced apart angularly arranged rollers 332 which ride on tracks 334 rigid with the frame for support of the carriage during reciprocal movement with the air cylinder.

The carriage is provided with a trip 336 for engagement with the arm 337 to make the switch 338 when the carriage is displaced to its rearward or operated position and to engage the arm 340 to make switch 342 when the carriage is returned to its normal or retracted position. Thus the switch members 338 and 342 are spaced apart longitudinally by a distance corresponding to the length of stroke of the ram.

The ram 324 is aligned to extend horizontally with about the center of the casting in the cage when supported on the spinner rolls. In retracted position, the end of the ram is adapted to be located clear of the cage and forwardly thereof. The ram is dimensioned to have a length greater than the length of the cage so as to be able to be projected lengthwise through the cage for full ejection of the casting therefrom. For this purpose, it is also desirable to provide for a length of stroke for displacement of the carriage and the supported ram which is greater than the length of the cage to displace the end of the ram through the cage for purposes of ejection of the casting.

The means for displacement of the now emptied cage from the spinner rollers and from the loading section to the empty cage conveyor 32 is somewhat a repetition of the means employed at the loading station for displacement of the loaded cage onto the conveyor rolls. Such means comprises an air cylinder 346 fixed at one end on a pivoted on a pin 360 underlying the opposite side of the frame 322. The other end of the piston rod 352 is fixed at its outer end onto a pivot pin 354 mounted on a bracket 356 fixed to the underside of a cage pusher arm 358. The free end of the arm underlies the cage on the side away from the conveyor while the other end of the arm is pivoted on a pin 360 underlying the opposite side of the cage whereby the arm is capable of rocking movement about its pivot between raised and lowered positions responsive to actuation by the air cylinder 346.

Responsive to rocking movement of the arm 358 to raised position, the end of the arm comes into engagement with the underside of the unloaded cage 20 to lift it off the spinner rollers for displacement laterally onto a ramp 364 over which the loaded cage rolls onto the empty cage conveyor 32. Switch means including a switch box 366 and limit switch arm 368 are positioned to be engaged by a trip 370 rotatable with the arm 358 to signal return of the arm to lowered position. The unloading section is also provided with a switch 371 having a limit switch arm 372 in position to be actuated by the block 312 to signal the engagement with the stop 27 when the cage reaches proper orientation on the spinning rolls for ejection of the casting.

The ramp 364 extends from the unloading station to the empty cage conveyor 32 whereby the empty cage displaced from the spinner rolls in the unloading station is received on the trough of the conveyor at the rearward end thereof.

When deposited, the ring members of the empty cage are engaged by the top flight of the traveling chain 66 to advance the empty cage forwardly toward the head end of the conveyor in preparation for its use in another cycle of operation.

Figure 23:
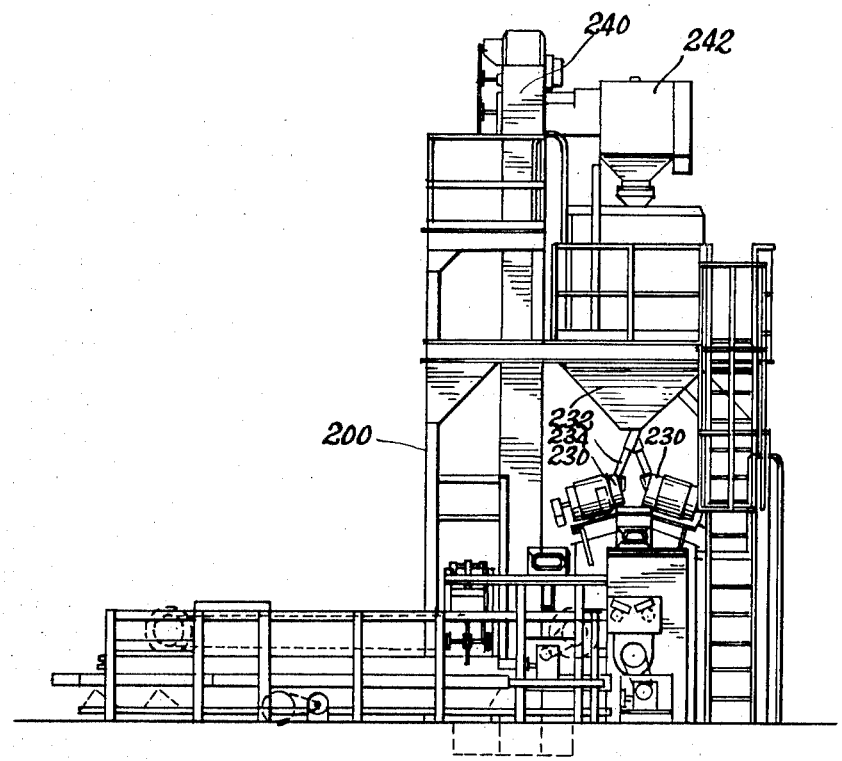
FIG. 23 is a front elevational view of the blast section of the machine.

Having described the construction and operation of the machine, reference will now be made to the sequence of operations and switch diagrams as illustrated in FIGS. 1, 2 and 23 of the drawings. The conventional symbols and numbers are used in the drawings so that the symbols and numbers can be related one to the other in the diagram and in the electrical wiring diagram of FIGS. 24a and 24b. When such switch and operating members are referred to in the previous description, the number reference given to the element will also be included in FIGS. 1, 2 and 23.

Again starting with the empty cage conveyor 32, the limit switch 54–6 (1LS) is engaged by the ring member of the oncoming cage 20 to make the switch and set the latch (5L) by displacement of the stop pin 52 by the air cylinder 50.

Arrival of the leading cage at the head end of the conveyor operates the trip 82 of the limit switch 84 (2LS) for actuation of solenoid 2S. The air cylinder 104 then operates to rock the arm 90 about its pivot to kick the empty cage over onto the ramp leading onto the spinner rollers 100 and 102. Upon return of the arm 90 to normal position, the trip 110 engages switch arm 108 of switch 106 (3LS) to operate the solenoid 1S for retraction of the stop 52.

When the spinning cage is engaged by the stop bar 130, the limit switch 4LS is made to initiate the timing sequence for operation of the elements to displace the casting into the empty cage. The load pusher air cylinder operation is initiated by the solenoid 4S. At the limit of its stroke, the carriage trip 163 engages switch 160 (7LS) to reverse the stroke. Upon return of the carriage to starting position, the trip 163 engages the arm of switch 162 (8LS) to inactivate the piston.

Limit switch 149 (9LS) is operated by the swing gate as the loaded cage is displaced from the rollers to the roller conveyor.

In response to the making of the switch 162 (8LS), the air cylinder 160 is operated to rock arm 172 about its pivot to kick the loaded cage from the spinner rollers into the vestibule and onto the conveyor rollers 180–182. As the kicker arm 172 returns to normal position, the trip 173 makes the switch 175 (6LS).

With the loaded cage on the rollers 180–182, the air cylinder 208 is operated to displace the carriage supported ram 202 for pushing the loaded cage rearwardly along the rollers. When the carriage leaves the end of its stroke, the trip 218 engages the arm 220 of the limit switch 222 (13LS) to reverse the stroke. When the carriage returns to normal retracted position, the trip 218 engages the arm 224 of the limit switch 226 (12LS).

In the unloading vestibule, the limit switch 15LS is made when the cradle is advanced by the air cylinder 264 to its operated position on the raised track. It holds in this position and initiates operation of the kicker air cylinder 290 for rocking the lever arm 284–288 in the direction to lift the loaded cage off the raised cradle for lateral displacement to the unloading station. Outward displacement of the piston rod is controlled by limit switch 17LS to reverse the stroke which, when completed, makes the limit switch 16LS to signal the solenoid 83 for operation of the air cylinder 264 to enable return of the cradle until the limit switch 14LS is made.

Making the limit switch 15LS also operates to raise the door 296 of the unloading vestibule. The raising and lowering of the door is controlled by the limit switch 18LS.

When the limit switch 370 (19LS) is made to stop rotation of the spinner rollers, the solenoid 11S is operated to initiate operation of the air cylinder 330. When the carriage completes its stroke, the trip 336 engages the arm 337 of the limit switch 338 (21LS) to reverse the stroke. When the carriage returns to starting position, the trip engages arm 340 of limit switch 342 (20LS) to inactivate the air cylinder. The air cylinder 346 is operated to rock arm 358 to kick the empty cage from the spinner rollers onto the ramp bar 364 over which it travels to the empty cage conveyor.

Figure 24B:
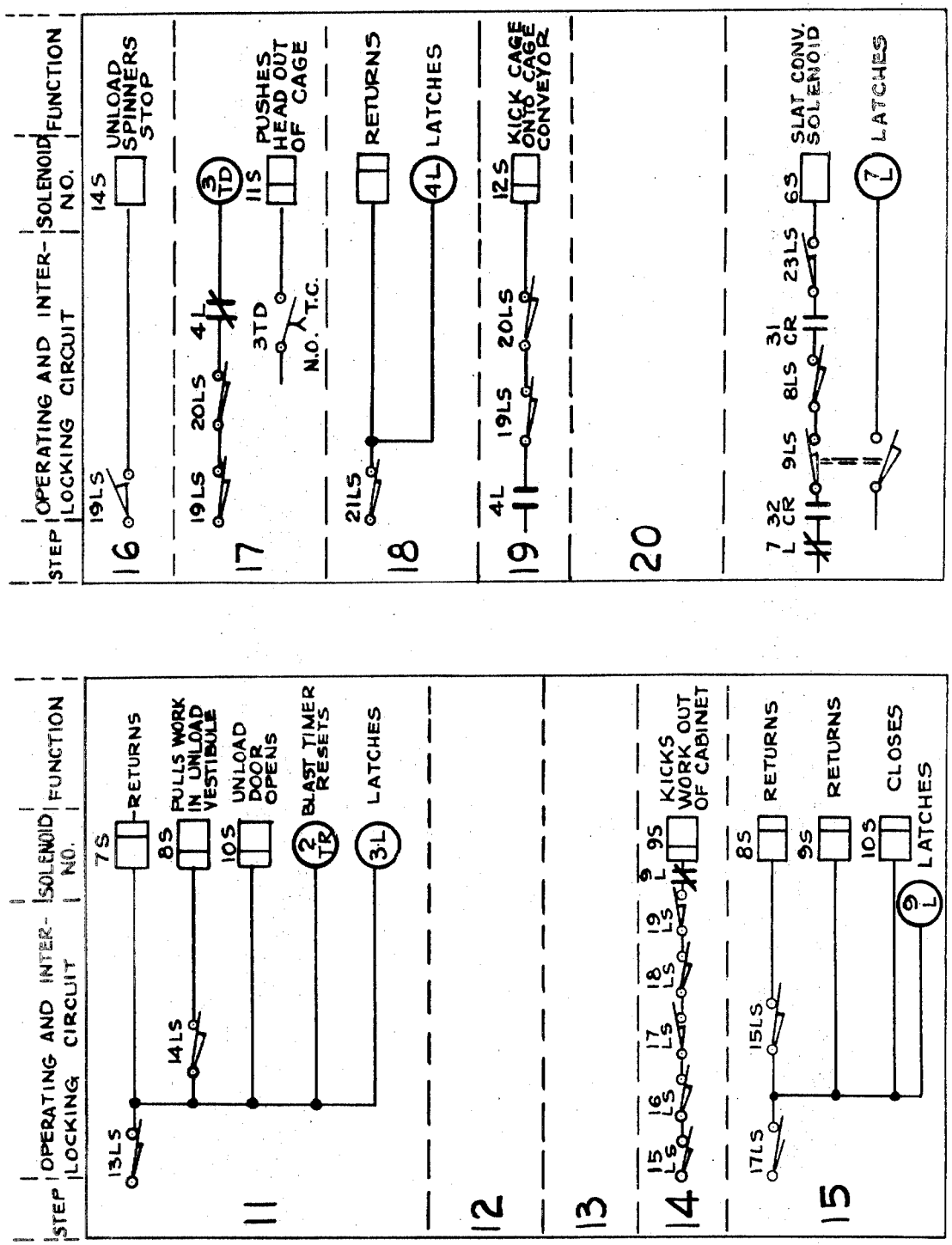

A timer, identified as 2TR in step 11 of FIG. 24b, controls the operation of the centrifugal wheels to effect operation thereof in response to the advancement of a cage along the conveyor rollers into the blast cabinet. The timer is initiated in response to actuation of the limit switch 222 (13LS) as the forwardmost of the aligned cages is advanced along the rollers correspondingly to advance all of the aligned cages one increment through the blast cabinet.

In the event that cages are not being fed onto the rollers for advancement of the cages along the conveyor, the timer is adapted to shut off the wheels and the blast section so as to avoid exposure of the casting within the cabinet to blast of particulate treating material to which the cages might otherwise normally be exposed during operation of the machine. Thus the castings in each of the cages are exposed to a substantially uniform amount of treatment by the blast media, independent of the regularity of feed of cages onto the conveyor for advancement of the aligned cages through the cabinet.

It will be apparent that the cages will slide lengthwise on the peripheral surfaces of the rotating rollers during advancement. In general, the cages will slide over the peripheral surfaces without interfering with the turning movements of the rollers and will rotate with the rollers during the intervals between advancement for full exposure of the surfaces of the castings to treatment.

It will be apparent that the entire sequence of operations can be carried out without the necessity manually to handle the cages or the castings adapted to be treated therein. It will also be apparent that maximum stability and protection of parts is achieved in the system described with optimum coverage of the surfaces of the castings for treatment whereby less time and materials are required for proper treatment of the castings.

The descibed automatic sequence of operations serves markedly to reduce the amount of labor required per unit part and it operates also greatly to increase the rate of output whereby more parts can be treated per unit volume of treating material, per unit of labor and per unit of space occupied by the machine, with corresponding increase in efficiency and reduction in cost.

The assembly described provides for better coverage of the surfaces to produce a product with less entrapment of materials and correspondingly less cost for freeing the product of contaminants.

It will be understood that the cages may be formed to various dimensions and shapes to accommodate parts of various sizes and contours within the limits prescribed by the end rings.

It will still further be understood that various of the described driving means or actuating means may be substituted by other equivalent means normal to the trade and that other changes may be made in the details of construction, arrangement and operation without departing from the spirit of the invention, especially as defined in the following claims.

We claim:

1. A process for the surface treatment of large shaped articles in which use is made of an open cage having spread ring supports and in which use is made of an elongate roller conveyor comprising transporting said cage to a loading station, inserting the article into said cage for retention of the article within the cage by rotating the cage for proper orientation to receive the article to be inserted therein, stopping rotation of the cage when in properly oriented position and displacing the article endwise into the cage while the latter is held stationarily in the oriented position, transporting the loaded cage from the loading station onto the elongate roller conveyor, displacing said loaded cage endwise along said conveyor through a blasting zone, throwing particulate treating material at high velocity onto the article in the loaded cage during travel through the blasting zone whereby particulate material engages the exposed surfaces of the article for treatment, rotating the loaded cage during travel along the roller conveyor through the blasting zone for maximum exposure of the surfaces of the article to the treating material, displacing the loaded cage from the roller conveyor to an unloading station after passage through the blasting zone, and displacing the article endwise from the cage while the unloading station to free the cage for return to the loading station.

2. The process as claimed in claim 1 which includes the steps of aligning the article endwise with the center of the cage, displacing the article endwise into the cage, and bracing the cage to prevent endwise displacement in response to the forces operating during insertion of the article therein.

3. The process as claimed in claim 1 in which the cages are displaced endwise along the roller conveyor by engaging the endmost loaded cage on the conveyor to effect displacement of the cage longitudinally along the roller conveyor by an amount corresponding to the length of the cage whereby the cages become aligned in end to end relationship on the roller conveyor and are displaced stepwise over the conveyor.

4. The process as claimed in claim 1 in which the loaded cages are slid lengthwise over the surfaces of the roller conveyor having rollers which are contonuously rotated for support of the loaded cages.

5. The process as claimed in claim 1 which includes the step of enclosing the loaded cages on the roller conveyor during displacement to and through the blasting zone to prevent particulate material from being thrown out into the adjacent atmosphere.

6. The process as claimed in claim 1 which includes the steps of raising the cages off of the roller conveyor after the loaded cages have passed through the blasting zone to free the loaded cages from the conveyor, and displacing the loaded cages from their raised position over the roller conveyor laterally to the unloading station.

7. The process as claimed in claim 1 which includes the steps in the unloading station of rotating the loaded cage until it becomes properly oriented for displacement of the article therefrom, stopping rotation of the loaded cage when in properly oriented position, and displacing the article endwise from the cage while the latter is stationarily supported in the oriented position.

8. The process as claimed in claim 1 which includes the steps of displacing the empty cage from the unloading station and returning the empty cage to the loading station.

9. The process as claimed in claim 8 in which the steps are carried out in a substantially continuous operation.

10. In a process for the surface treatment of articles of large dimension and weight by throwing particulate treating material onto the surfaces of the articles, the steps of advancing the articles in lengthwise alignment along a linear path from an entrance area through a blast area to an exit area, throwing particulate treating material onto the articles during movement linearly through the blast area, supporting the articles by an elongate support which extends continuously from the entrance area through the blast area to the exit area to define the linear path, continuously rotating the support whereby the articles in engagement therewith are continuously rotated during advancement lengthwise along the linear path from the entrance area through the blast area to the exit area, feeding articles onto the support at the entrance area by lengthwise displacement into engagement with the endmost of the aligned articles on the support whereby the remainder of the articles aligned in end to end relationship on the support are slid relative to the support the length of one article lengthwise along the support from the entrance area through the blast area to the exit area.

References Cited

UNITED STATES PATENTS

| | | | |
|---|---|---|---|
| 1,836,272 | 12/1931 | Mulvany | 51—9 |
| 2,131,769 | 10/1938 | Turnbull | 51—15 X |
| 2,154,843 | 4/1939 | Hammell | 51—14 X |
| 2,154,879 | 4/1939 | Turnbull | 51—9 |
| 2,204,636 | 6/1940 | Turnbull | 51—14 X |
| 2,565,341 | 8/1951 | Arispe | 51—15 |

LESTER M. SWINGLE, Primary Examiner

U.S. Cl. X.R.

51—9, 15

UNITED STATES PATENT OFFICE
CERTIFICATE OF CORRECTION

Patent No. 3,517,465                                           June 30, 1970

Ardee H. Freeman et al.

It is certified that error appears in the above identified patent and that said Letters Patent are hereby corrected as shown below:

Column 10, line 53, "pivoted on a pin 360 underlying the opposite side of" should read -- pivot pin 348 mounted on a bracket 350 fixed to --. Column 12, line 74, "spread" should read -- spaced --.

Signed and sealed this 16th day of March 1971.

(SEAL)
Attest:

Edward M. Fletcher, Jr.

Attesting Officer

WILLIAM E. SCHUYLER, JR.
                                                                   Commissioner of Patents